(12) United States Patent
Weniger et al.

(10) Patent No.: US 9,408,114 B2
(45) Date of Patent: *Aug. 2, 2016

(54) INTER-DOMAIN CONTEXT TRANSFER USING CONTEXT TRANSFER MANAGERS

(71) Applicant: OPTIS WIRELESS TECHNOLOGY, LLC, Plano, TX (US)

(72) Inventors: Kilian Weniger, Langen (DE); Jens Bachmann, Langen (DE); Rolf Hakenbert, Langen (DE)

(73) Assignee: Optis Wireless Technology, LLC, Plano, TX (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/248,506

(22) Filed: Apr. 9, 2014

(65) Prior Publication Data

US 2014/0301365 A1    Oct. 9, 2014

Related U.S. Application Data

(63) Continuation of application No. 13/008,818, filed on Jan. 18, 2011, now Pat. No. 8,719,453, which is a continuation of application No. 11/817,490, filed as application No. PCT/EP2006/002330 on Mar. 14, 2006, now Pat. No. 7,890,577.

(30) Foreign Application Priority Data

Mar. 29, 2005    (EP) .................................... 05006790

(51) Int. Cl.
*H04W 36/00* (2009.01)
*H04L 12/857* (2013.01)
(Continued)

(52) U.S. Cl.
CPC ......... *H04W 36/0038* (2013.01); *H04L 41/147* (2013.01); *H04L 47/2491* (2013.01);
(Continued)

(58) Field of Classification Search
CPC ............ H04W 36/0038; H04W 12/04; H04W 36/0022
USPC ........................................................ 370/331
See application file for complete search history.

(56) References Cited

U.S. PATENT DOCUMENTS 6,377,548 B1    4/2002   Chuah
6,990,337 B2    1/2006   O'Neill
(Continued)

FOREIGN PATENT DOCUMENTS

EP          1 531 645       5/2005
JP          2001-298762     10/2001
(Continued)

OTHER PUBLICATIONS

Japanese Office Action dated Dec. 13, 2011 with translation.
(Continued)

*Primary Examiner* — Shripal Khajuria
*Assistant Examiner* — Faisal Choudhury
(74) *Attorney, Agent, or Firm* — Nixon & Vanderhye, P.C.

(57) ABSTRACT

A method and apparatus for improved context transfer in heterogeneous networks is presented. Context information is collected from source entities in a first access network by a context transfer manager and transmitted to a context transfer manager of a second access network which forwards the context information to target entities therein. In one of the context transfer managers at least a part of the context information is translated from a format supported in the first access network to another format supported in the second access network. The method may be carried out proactively preceding a handover or reactively following a handover. In one embodiment, context transfer within one access domain is performed directly between access routers, whereas context transfer between different access domains is performed via the context managers. In another embodiment, beacons from access points are counted in order to determine candidates for a pending handover.

16 Claims, 9 Drawing Sheets

(51) Int. Cl.
*H04L 29/08* (2006.01)
*H04W 12/04* (2009.01)
*H04W 4/00* (2009.01)
*H04L 12/24* (2006.01)
*H04W 36/14* (2009.01)
*H04W 76/04* (2009.01)

(52) U.S. Cl.
CPC ......... *H04L67/2823* (2013.01); *H04W 12/04* (2013.01); *H04W 36/0022* (2013.01); *H04L 41/12* (2013.01); *H04L 67/2828* (2013.01); *H04W 36/0033* (2013.01); *H04W 36/14* (2013.01); *H04W 76/041* (2013.01)

(56) References Cited

U.S. PATENT DOCUMENTS

| | | |
|---|---|---|
| 2001/0032254 A1 | 10/2001 | Hawkins |
| 2002/0109706 A1 | 8/2002 | Lincke |
| 2003/0103496 A1* | 6/2003 | Lakshmi Narayanan ............ H04L 29/06 370/352 |
| 2003/0204599 A1 | 10/2003 | Trossen |
| 2003/0227911 A1 | 12/2003 | Trossen |
| 2004/0005894 A1 | 1/2004 | Trossen |
| 2004/0203711 A1 | 10/2004 | O'Neill |
| 2005/0124344 A1* | 6/2005 | Laroia ................. H04W 36/18 455/436 |
| 2005/0171720 A1* | 8/2005 | Olson ................. H04W 12/12 702/121 |
| 2006/0187858 A1* | 8/2006 | Kenichi ............... H04W 36/08 370/254 |
| 2007/0110009 A1* | 5/2007 | Bachmann .......... H04L 12/2856 370/338 |

FOREIGN PATENT DOCUMENTS

| | | |
|---|---|---|
| WO | 03/049377 | 6/2003 |
| WO | 03/052962 | 6/2003 |
| WO | 03/091900 | 11/2003 |
| WO | 03/092314 | 11/2003 |
| WO | 03/092315 | 11/2003 |
| WO | 2004/070989 | 8/2004 |
| WO | 2005/027557 | 3/2005 |
| WO | 2006/102988 | 10/2006 |

OTHER PUBLICATIONS

International Search Report dated May 12, 2006.
M. Liesch et al, "Candidated Access Router Discover", IETF Seamoby Working Group, Sep. 2004, pp. 1-47.
J. Loughney et al, "Context Transfer Protocol", IETF Internet Draft, Aug. 2004, pp. 1-32.
"IEE Trial-Use Recommended Practice for Multi-Vendor Access Point Interoperability via an Inter-Access Point Protocol Across Distribution Systems Supporting IEEE 802.11 Operation", IEEE Computer Society, IEEE Std 802.11F-2003, Jul. 2003, pp. 1-67.

* cited by examiner

INTER-DOMAIN CONTEXT TRANSFER USING CONTEXT TRANSFER MANAGERS

This application is a continuation of U.S. patent application Ser. No. 13/008,818 filed Jan. 18, 2011, pending, which is a continuation U.S. patent application Ser. No. 11/817,490 filed Aug. 30, 2007, which is a national stage of PCT/EP2006/002330 filed Mar. 14, 2006, which is based on and claims priority of European Patent Application 05006790.9 filed Mar. 29, 2005, the entire contents of each of which are incorporated by reference herein.

BACKGROUND

1. Field of the Invention

The invention is related to mobile communications systems. More specifically, it relates to context transfer for seamless inter-domain handover support in heterogeneous networks.

2. Description of the Related Art

The main property of 4G mobile communication networks is the heterogeneity of radio and network technologies. A 4G network can be regarded as an integrated system composed of various networks that present themselves as one network to the end user, with Internet Protocol (IP) as a common basis. A challenge is to provide seamless mobility in such a heterogeneous environment to support interactive applications such as Voice over Internet Protocol (VoIP) telephony.

An IP-based heterogeneous network architecture is assumed, consisting of several inter-connected networks, which may use different network technologies (e.g. Differentiated Services Quality of Service DiffServ QoS, Integrated Services Quality of Service IntServ QoS etc.), different access network technologies (e.g. wireless local area network WLAN, UMTS radio access network UTRAN, . . . ) and may be under control of different operators. The network has mobility support, i.e. a Mobile Node (MN) can move between those networks without breaking connections on higher layers (e.g. Transmission Control Protocol TCP). This process is called "handover" and can e.g. be provided by Mobile IP on layer 3. However, which mechanism is used for this purpose has no effect on this invention.

A handover process comprises various tasks like authentication and authorization at the new network, relocation of radio link and IP session, establishing QoS states in the network etc. To support seamless handover, the performance of the handover has to be improved, i.e. the handover delay has to be reduced. To this end, context transfer can be applied. "Context transfer" is a term for transferring MN-related context or states (e.g. for QoS, header compression, AAA etc) from one network entity (e.g. Access Router AR) to another, so that the MN does not have to re-establish the states in the new network entity from scratch after the handover.

The "seamoby" working group in the Internet Engineering Task Force (IETF) has developed a layer 3 protocol called Context Transfer Protocol (CTP) to enable authorized context transfer between ARs in IP networks (J. Loughney, M. Nakhjiri, C. Perkins, R. Koodli, "Context Transfer Protocol", IETF Internet Draft draft-ietf-seamoby-ctp-11.txt, August 2004). It supports proactive or predictive context transfer, i.e. transferring the context from the current AR to the next AR before the handover is performed, as well as reactive context transfer, i.e. transferring the context from the previous AR to the current AR after the handover took place. The context transfer can be triggered by the mobile node, the previous AR or the next AR, respectively. CTP defines various messages: Context Transfer Request (CT-Req), Context Transfer Data (CTD), Context Transfer Data Reply (CTDR), Context Transfer Activate Request (CTAR), Context Transfer Activate Acknowledge (CTAA), and Context Transfer Cancel (CTC). These messages are exchanged between mobile node, previous AR and next AR. CTP assumes that MN and AR1 share a key for authorization purposes.

FIG. 1 shows the signalling flow for a proactive context transfer with CTP. AR1 102 and AR2 103 belong to different networks 104 and 105. After determining the IP address of AR2 103 (also called target or next AR/nAR) in S106, e.g. with support of the CARD protocol (see below), the MN 101 sends a CTAR message to AR1 102 (also called source or previous AR/pAR) in S107 which contains the IP address of AR2, the IP address of the MN, a sequence number (SN) to match acknowledgements to requests, an authorization token and the types of context to be transferred. The authorization token is calculated by MN using a hash function and a key that is shared with AR1. AR1 verifies the token and, if successful, transfers the context data in S108 together with the shared key to AR2 using the CTD message. AR2 can acknowledge the receipt with a CTDR message in S109. After the handover, the MN sends a CTAR message to AR2 in S110, which then again verifies the authorization token and installs the context in case of successful verification. Note that the message contains the IP address of pAR and the MN at the time it was attached to the pAR. Finally, AR2 can inform MN in S111 about the status of the context transfer by sending a CTAA message.

FIG. 2 shows the signalling flow in case of a reactive context transfer. The procedure is similar, but in this case MN/UE 101 first sends a CTAR message to AR2 103 in S201. Thereafter AR2 requests the context from AR1 in S202 using a CTR message. In S203 AR2 receives context data and shared key from AR1 102. Again, AR2 can send a CTAA message to MN/UE 101 in S204 and acknowledge the receipt with a CTDR message sent to AR1 in S205.

CTP is designed for AR-to-AR context transfer only. Heterogeneous networks or other source/target entities are not considered. In case of an inter-domain handover, additional problems arise that are not addressed by CTP as, e.g., different representation of context in source and target network, the need for potentially many inter-domain security associations (SAs) in order to secure the context transfer path or the automatic establishment of those SAs. Consequently a method is needed for context transfer in heterogeneous networks.

The seamoby working group developed another protocol, the Candidate Access Router Discovery (CARD) protocol (M. Liebsch, A. Singh, H. Chaskar, D. Funato, E. Shim, "Candidate Access Router Discovery", IETF Internet Draft draft-ietf-seamoby-card-protocol-08.txt, September 2004). CARD has mainly two tasks:

Determining the layer 3 identifiers (IP addresses) of the CARs given that the mobile node has obtained layer 2 addresses of the corresponding candidate access points, e.g. by receiving beacons from them; and Discovering the capabilities of those CARs to assist the mobile node in determining the target AR.

The protocol can be used to support the determination of the target AR for a predictive context transfer using CTP. The layer 3 identifiers of neighbouring ARs can be determined from the layer 2 identifiers discovered by the mobile node from received beacons using a centralized or a distributed approach. With the centralized approach, a CARD server performs reverse address resolution from layer 2 identifiers. With the distributed approach, information received from mobile nodes during handovers is used to establish a distributed address resolution cache. After the current AR discovered the layer 3 identifier of CARs, it can request information about related capabilities from them and give this information to the MN.

IEEE 802.11f ("Trial-Use Recommended Practice for Multi-Vendor Access Point Interoperability via an Inter-Access Point Protocol Across Distribution Systems Supporting IEEE 802.11 Operation", IEEE Computer Society, IEEE Std 802.11F-2003, July 2003) defines a layer 2 context transfer scheme (mainly for security-related context) to decrease the layer 2 handover delay when reauthenticating and reassociating with a new access point. Therefore, the old and the new access point (AP) exchange IAPP-MOVE or IAPP-CACHE packets for a reactive or proactive context transfer, respectively. In case of a proactive context transfer, APs construct and maintain so-called neighbour graphs based on information received in reassociation-request or IAPP-MOVE.request frames. Neighbour graphs are used to determine candidate APs for the context transfer.

802.11 is designed for AP-to-AP context transfer only. Heterogeneous networks or other source/target entities are not considered. Consequently there is a need for a method for context transfer in heterogeneous networks.

The overall goal of performing context transfer is to reduce the handover delay to support seamless mobility. Thus, the context transfer should be as fast as possible. To achieve this goal, the context transfer should be done in a proactive manner if possible and the context transfer path should be as short as possible. Reactive context transfer should be supported as well in case a handover cannot be predicted early enough. To provide protection against malicious nodes, the transfer must also be secure (per-packet authentication, integrity protection and confidentiality), which requires IPsec security associations (SA) between the source and target entities of the context transfer. An SA usually involves authentication and encryption in the information transfer. All those features are provided by CTP for intra-domain handovers.

However, in case of inter-domain handovers in a heterogeneous environment such as a 4G network, additional requirements must be considered: multiple source/target entities of different kind may be involved, e.g. AAA servers and ARs. Furthermore, source and target network may use different radio and network technologies, e.g., DiffServ and IntServ Qos technology, which may require additional means such as translation of context to a representation which the target network understands. Finally, managing inter-domain SA causes effort, such as key exchange and distribution or may even require manual intervention. Thus, the number of inter-domain SAs should be minimized. Furthermore, previous approaches utilizing management nodes for context transfer do not always use the best path for context transfer, which leads to sub-optimal performance.

WO03052962 describes a system for storing inactive context in a central database (one per administrative domain) and active context in a local context directory located in ARs. A protocol for transferring context between ARs is presented as well. A so-called memory transfer agent is used to transfer only active feature context, i.e. context of active or "in progress"-microflows, from one AR to another. This document supports only a proactive context transfer scheme. The central entity comprises a Main Contact Database (MCD), a Memory Gateway External (MGE) as an interface to other domains and a Memory Gateway local (MGL) as interface to the local ARs. The AR contains a Local Context Directory (LCD), which maintains a list of active contexts of all mobile nodes associated with that AR, a Memory Tranfer Agent (MTA), which is responsible for transferring context between LCDs of different ARs, and a Context Transfer Agent (CTA), which establishes contact to a target AR. When a new microflow becomes active, context is transferred from the MCD via the MGL to the LCD of the current AR. The context transfer is triggered by the mobile node, which sends an ICMP message to the current AR. This message contains a list of target ARs and their preference level. Subsequently, the current AR requests a transfer of the active contexts of this mobile node to the target AR. The target AR may also request additional context from the MCD. In case a handover between different administrative domains is triggered, the context transfer between ARs takes place as usual, but additionally inactive context is transferred between the MCDs of both domains.

WO03052962 like CTP only supports AR-to-AR context transfer, but additionally stores inactive context in a main database. It shifts complexity from the ARs to policy servers in the network, e.g. to perform candidate access router discovery. The context transfer path in case of an inter-domain transfer is always AR1.fwdarw.PS1.fwdarw.AR2.fwdarw.PS2. Thus, each policy server needs (inter-domain) SAs to all edge ARs of adjacent networks, which may lead to scalability problems. Furthermore, a difference of context representation in source and target network leads to incomplete context transfers since no context translation is supported.

In WO03091900, another system is described for proactive transfer of application specific (as opposed to network specific) context between ARs of different administrative domains and access networks. The application specific context is created by the mobile node beforehand. The new AR evaluates the application context and, if necessary, discovers network entities in its domain that support the desired application. For example, the mobile node receives a video stream over a WLAN access network. Before it hands off to a cellular network, it constructs application-specific context containing information about the video stream (bit rate, format etc.) and sends it to the current AR. The AR transfers the context to the next AR of the cellular network, which can then discover and set up a ping-pong tunnel to a proxy server, transcoding the video stream to a lower bit-rate stream.

WO03091900 handles registering and transfer of application-specific functional requirements, e.g. to provide application proxies at the new point of attachment.

In WO02092314, a system is presented that deals with discovering appropriate candidate ARs. It includes a method for detecting, based on the application specific context on the mobile node, a first set of capabilities of a network node that facilitates maintaining an IP session, and a method for querying from a potential next network node capability information and determining if this node is able to fulfil the requirements. The query can be done by the mobile node or the current AR.

WO02092314 focuses on corresponding candidate access router discovery mechanisms and does not provide methods for inter-domain context transfer.

The method presented in WO03049377 utilizes the policy server, a central entity per administrative domain. This server is responsible for selecting possible target ARs. In the first step, all ARs report their capabilities to the policy server. When the mobile node receives information about another AR, it sends identity information, e.g. the layer 2 identifier of the access point, to the current AR which forwards it to the policy server of the current domain. In case of an inter-domain handover, the identifier and other information about the mobile node are sent to the policy server of the target domain. This server determines if it can serve the mobile node. If so, it computes a list of candidate ARs based on given full topology information and according to an algorithm that considers the mobile node's capabilities, the traffic load on the ARs and operator defined rules. The context transfer itself can be performed in a proactive or reactive manner. In the reactive case, the mobile node triggers the context transfer by sending a request message to the new AR. The context is then transferred from the previous AR to the corresponding policy server, which may add static context and may collect dynamic context from other network entities, and sends it to the current AR. In the proactive case, the request message is sent to the current AR and the context is transferred from the current AR over the corresponding policy server to the next AR. In both cases, the target AR additionally transfers the context to its policy server, which can then forward the context to other network entities, like security gateways.

In the system described in WO2004070989, a so-called Core State Management Node (CSMN) is located in the core of the network, which stores, manipulates and forwards context to prevent the need for signalling between ARs. The CSMN can be co-located with an AAA server and may store state data itself or the location of the state if located in another network entity. Both, proactive and reactive context transfers are supported. The mobile node triggers the context transfer by sending a message to the current AR which includes identifiers of the mobile node and of the target AR as well as a region ID in case of a handover between regions. In case of a handover within the region of one CSMN, the previous AR transfers the state to the CSMN, which then stores the state. The next AR then retrieves the state from the CSMN. If a handover takes place between two regions, two CSMNs are involved in the context transfer. In the reactive case, the context is transferred from the previous AR to the corresponding CSMN, which stores the context. After receiving a trigger message from the mobile node, which includes an identifier of the previous region, the next AR can request the state from its CSMN after the handover, which retrieves the state from the CSMN of the previous region. In the proactive case, the context is transferred from the current AR to its CSMN, which stores it and forwards it to the target CSMN. After the handover, the target AR can retrieve the context from its CSMN. Message formats of the context transfer protocol are not defined.

In WO2004070989, again, different context representations and source/target entities are not supported. Additionally, the AR in the new network first retrieves the context from the CSMN after the handover, even in case of a proactive context transfer. Moreover, the context is routed over the CSMNs in both cases, inter- and intra-domain handover. Both issues result in additional handover latency. Also, no protocol is defined for performing the context transfer. Protocols currently in discussion in IETF standardization cannot be reused since they do not support the proposed architecture.

In WO03092315 a system and method is proposed that performs candidate AR discovery in an external server element, e.g. an application server outside the operator's network. This server is provided with information identifying the AR currently serving the mobile node and the ARs which are within reach of the mobile node. The server then determines one or more target ARs. The capability information needed for the selection algorithm can be initially provided by the operator or dynamically obtained from the mobile node or by querying the ARs. For the latter two approaches, appropriate SAs between the application server and all ARs are needed since the server can be located outside the operator's network. The dynamic candidate access discovery works as follows: the mobile node sends the layer 2 and 3 identifiers of the current and previous AR/AP to the application server after the handover. Thus, the server can establish and maintain an L2-L3 address mapping table and knows which ARs/APs are adjacent. When another mobile node receives layer 2 beacons containing the identifier from adjacent access points, it sends this information to the application server, which then can derive the layer 3 identifier of the corresponding ARs from this information using the address mapping table established before. After knowing the layer 3 identifiers of candidate ARs, information about their capabilities can be requested either by the application server or by the mobile node. Finally, the target router selection can be performed either in the mobile node or in the application server. Furthermore, methods are described for registering application specific context of the mobile node at the application server, which can take care of relocating, e.g., a security gateway, a location server or a proxy. In case of an inter-domain handover, the application server in the old domain discovers respective network entities, e.g. a location server, in the new domain.

WO03092315 only deals with candidate access router discovery. It does not provide solutions for the context transfer itself.

None of the proposals utilizes the context transfer protocol that is currently standardized by the IETF and none of them deals with the efficient automatic establishment and cancellation of SAs.

It is an object of the present invention to provide a method and an apparatus for context transfer in heterogeneous networks, which supports context transfer between access networks using different technologies and minimises the number of required inter-domain security associations.

SUMMARY OF THE INVENTION

The object can be achieved by utilizing at least one Context Transfer Manager (CTM) per domain that provides a single interface to other domains. This CTM is adapted to perform context translation, i.e. translation of context information into format and representation required by the target access network.

In one aspect of the present invention, a method for context transfer to be executed in a context transfer manager of a heterogeneous mobile network comprising a plurality of access networks comprises the steps of a) collecting context information related to a mobile node from at least one source entity within a first access network; b) transmitting the collected context information to a context transfer manager within a second access network; c) receiving context information related to a mobile node from a context transfer manager within an access network different from the first access network; d) forwarding the context information received in step c) to at least one target entity within the first network; and e) before step b) and/or after step c), translating at least a part of the context information from a format supported in one access network to another format supported in another access network.

In another aspect of the present invention, a computer-readable storage medium has stored thereon instruction, which, when executed on a context manager of a radio access network in a heterogeneous mobile network, cause the context manager to perform the method according to the first aspect.

In still a further aspect of the present invention, a context manager for an access network within a heterogeneous mobile network comprises means for collecting context information related to a mobile node from at least one source entity within a first access network; means for transmitting the collected context information to a context transfer manager within a second access network; means for receiving context information related to a mobile node from a context transfer manager within an access network different from the first access network; means for forwarding the context information, received from the context transfer manager within the access network different from the first access network, to at least one target entity within the first network; and means for translating at least a part of the context information from a format supported in one access network to another format supported in another access network.

In still another aspect of the present invention, a method to be executed in a heterogeneous mobile network comprising a plurality of access networks comprises the steps of the method according to the first aspect, executed in at least two context managers located in two different access networks of the mobile network, and the method further comprises the steps of f) sending from a mobile node a message to a first access router of the first access network, comprising information about the identity of the mobile node, information about an identity of a second access router, and information about types of context to be transferred; and g) forwarding said message from the access router to the context transfer manager in the first network prior to steps a) and b) being performed by said context transfer manager and steps c) and d) being performed in the context transfer manager of another access network to which said second access router belongs.

In yet another aspect of the present invention, a method to be executed in a heterogeneous mobile network comprising a plurality of access networks comprises the steps of the method according to the first aspect, executed in at least two context managers located in two different access networks of the mobile network, and further comprises the steps of sending from a mobile node a message to an access router of the second access network, comprising information about the identity of the mobile node, information about an identity of an access router in the first access network, and information about types of context to be transferred; forwarding said message from the access router to the context transfer manager in the second network; and sending a message from the context transfer manager in the second access network to the context manager in the first access network, comprising information about the identity of the mobile node and about types of context to be transferred, thereby causing steps a) and b) to be performed by said context transfer manager of the first access network and steps c) and d) to be performed in the context transfer manager of the second access network.

In still a further aspect of the present invention, a heterogeneous mobile network comprises at least one mobile node (101); and at least two access networks (104, 105), wherein at least two of the access networks each comprise at least one context transfer manager (302, 303) according to claim 10 and at least one access router (102, 103).

The utilization of dedicated management nodes (Context Transfer Manager, CTM) has many advantages. Those nodes can manage the context transfer and provide a single interface between two domains/access networks. If the context is routed over those nodes in case of inter-domain handovers, only one inter-domain SA is needed for context transfers between two domains. Additionally, the CTMs can perform further actions, like translating the context if the representation in both domains differs or triggering additional signalling, e.g. to reserve network resources for packet transmission related to the mobile host to which the context information belongs, to set up data tunnels in advance or establish an End-to-End QoS path in advance. This takes some burden from the ARs, eases the management of the network and may help operators hiding information about their network to other operators.

In summary, the benefits of this invention are
Support of inter-domain context transfer in heterogeneous networks including context translation and multiple source/target entities;
Minimisation of the number of inter-domain SAs;
Utilization of CTP, a protocol currently being standardized by the IETF;
Selection and utilization of the best context transfer path depending on the type of handover (inter-/intra-domain); and
early establishment and cancellation of SAs between CTMs.

BRIEF DESCRIPTION OF THE DRAWINGS

The accompanying drawings are incorporated into and form a part of the specification for the purpose of explaining the principles of the invention. The drawings are not to be understood as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The exemplary embodiments of the present invention will be described with reference to the figure drawings wherein like elements and structures are indicated by like reference numbers.

In the following, the invention will be explained without loss of generality for the example of CTP. However, the invention can be applied to any protocols that communicate context from AR to AR and require an SA between both ARs, such as "Fast handovers for Mobile IPv6" (Rajeev Koodli, "Fast Handovers for Mobile IPv6", IETF Internet Draft draft-ietf-mipshop-fast-mipv6-03.txt, October 2004).

As mentioned above, the CTM architecture has advantages for inter-domain context transfer in heterogeneous networks, especially if a handover to another domain is possible between different ARs. CTMs provide a single interface to other domains and thus minimize the number of inter-domain SAs, can take care of context translation, context collection (from various entities, such as AAA server) and aggregation.

FIG. 3 illustrates the difference between a direct context transfer between ARs and a context transfer over CTMs.

Access Network AN1 104 comprises AR1 102 as well as other ARs 301. AN2 105 comprises AR2 103 and further ARs 301. A mobile node 101 can communicate with each of the networks. While communicating with AN1 over AR1, the MN 101 might move such that it enters the service area of AN2 and is about to leave the service area of AN1. A handover is necessary, during which context for running applications has to be transferred from AR1 to AR2.

Figure 3B:
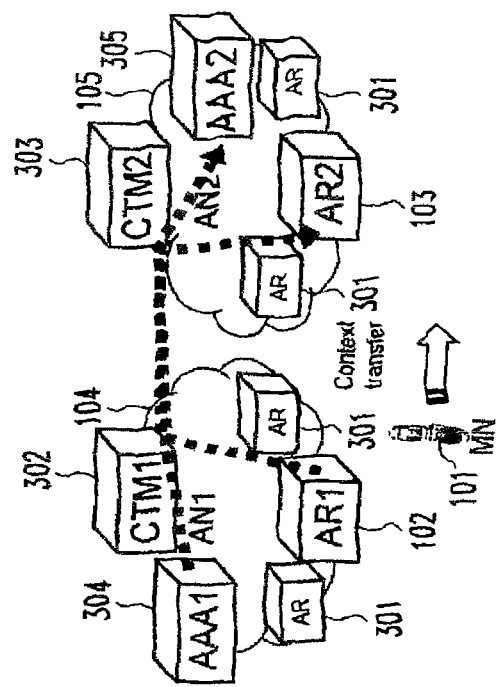
FIG. 3 shows context transfer directly between ARs (a) or over CTMs (b)
Figure 3A:
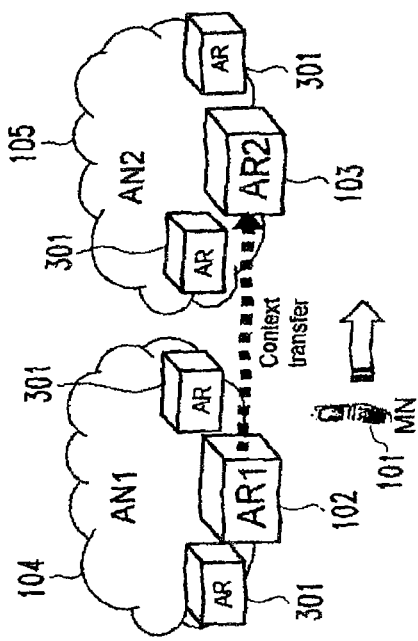

In FIG. 3a the context is directly transferred from AR1 to AR2. An SA is required between the ARs across the boundaries of the domains AN1 and AN2. At the same time more such SAs might exists between other ARs 301 related to services of further mobile nodes. In FIG. 3b one Context Transfer Manager CTM 302, 303 per domain handles the context transfer. Thus only one SA is required between the ANs 104 and 105 for all instances of context transfer going on.

However, CTP does not support the utilization of CTMs. The problem of routing the context (in case of CTP the CTD messages) over dedicated Context Transfer Management (CTM) entities could be solved by using IP-layer routing. A drawback of this approach is that the underlying routing infrastructure is affected and context aggregation is not possible. Furthermore, the router alert option would be needed in this case to enable the CTMs to manipulate the context on the fly. Therefore application layer routing is used: The source AR 102 forwards the CTAR message to the source CTM 302, which then requests the context from the source AR and various source entities, such as AAA1 (Authentication, Authorization, and Accounting entity 1) 304. After manipulating the context, the CTM 302 then forwards the context in an aggregated. CTD message to the target CTM 303 on application layer, which in turn may manipulate the context. Finally, it forwards the context to the respective target entities, such as AAA2 305 and AR2 103. The source CTM 302 knows the target AR's IP address from the received CTAR message. The source CTM is required to provide the target AR's IP address to the target CTM 303, so that the target CTM can forward the context to the target AR. This is realized by adding a new field containing the target AR's IP address to the CTD message.

Figure 4:
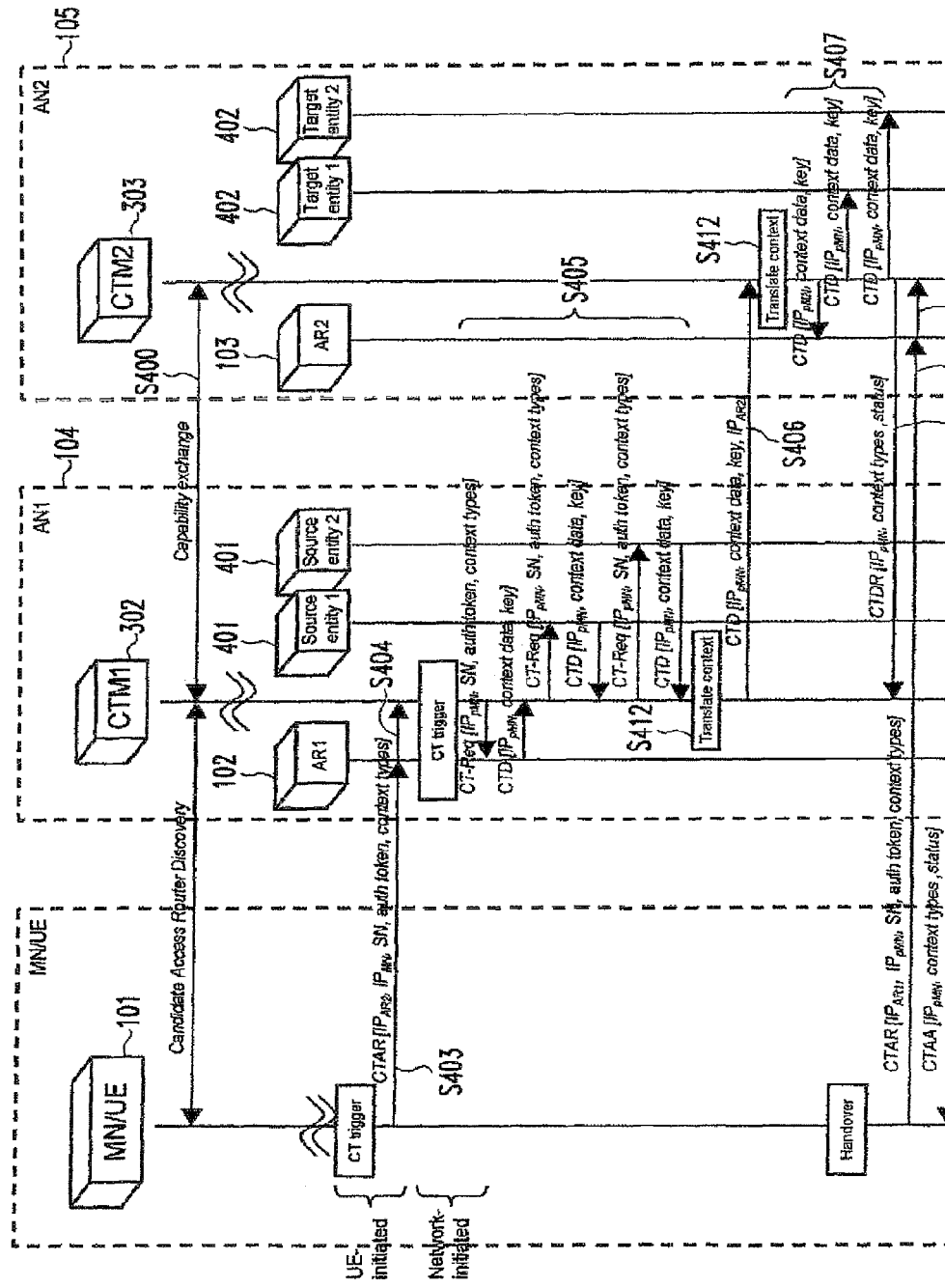
FIG. 4 illustrates the signalling flow for proactive inter-domain context transfer using CTP and CTMs.

FIG. 4 shows the signalling flow for a proactive inter-domain context transfer using CTP and CTMs. At S400, CTM1 302 and CTM2 303 exchange information about their capabilities and about capabilities of their access networks AN1 104 and AN2 105. This information may comprise information about supported context formats.

Figure 1:
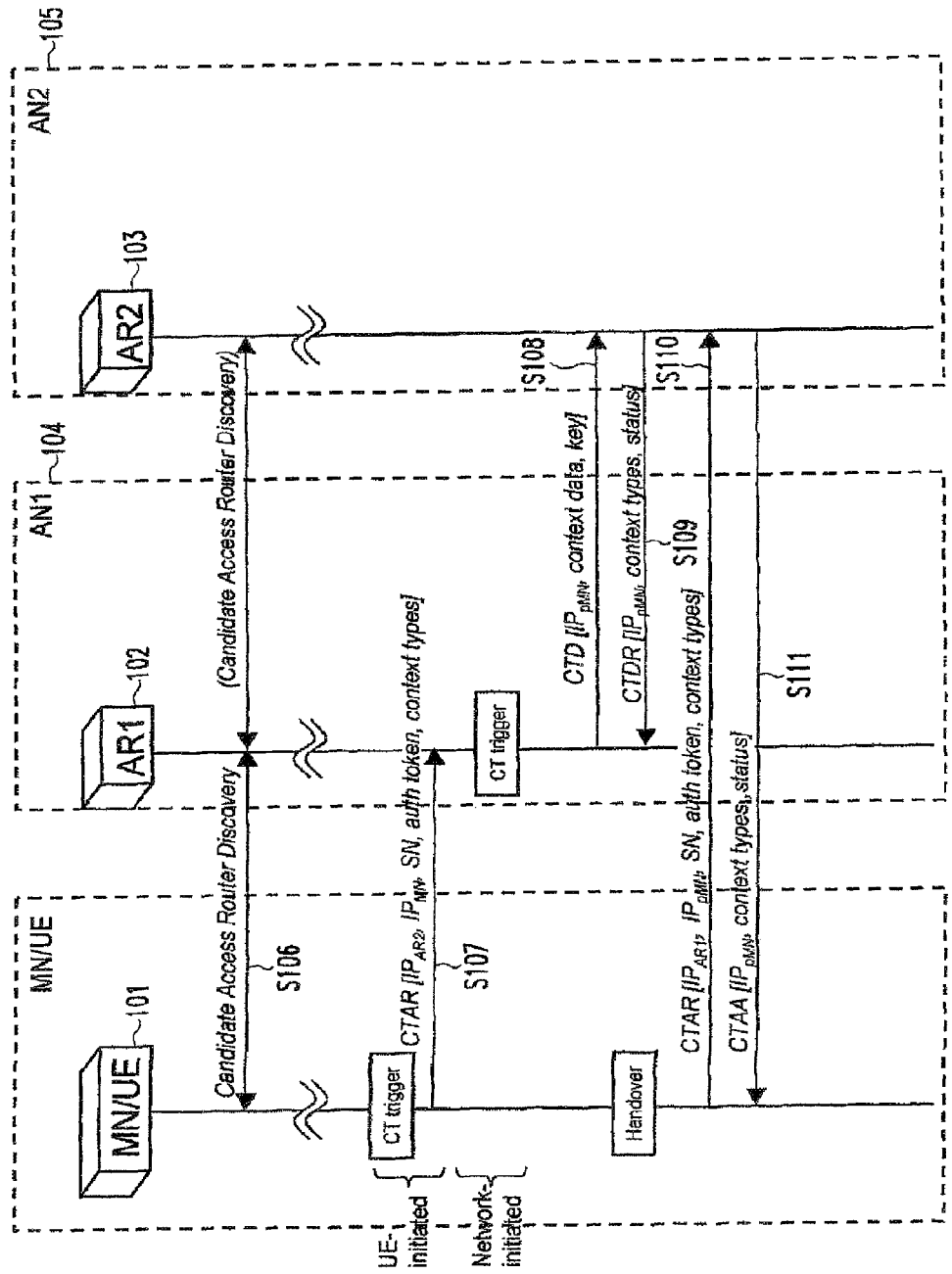
FIG. 1 illustrates the signalling flow for proactive context transfer using CTP.
Figure 2:
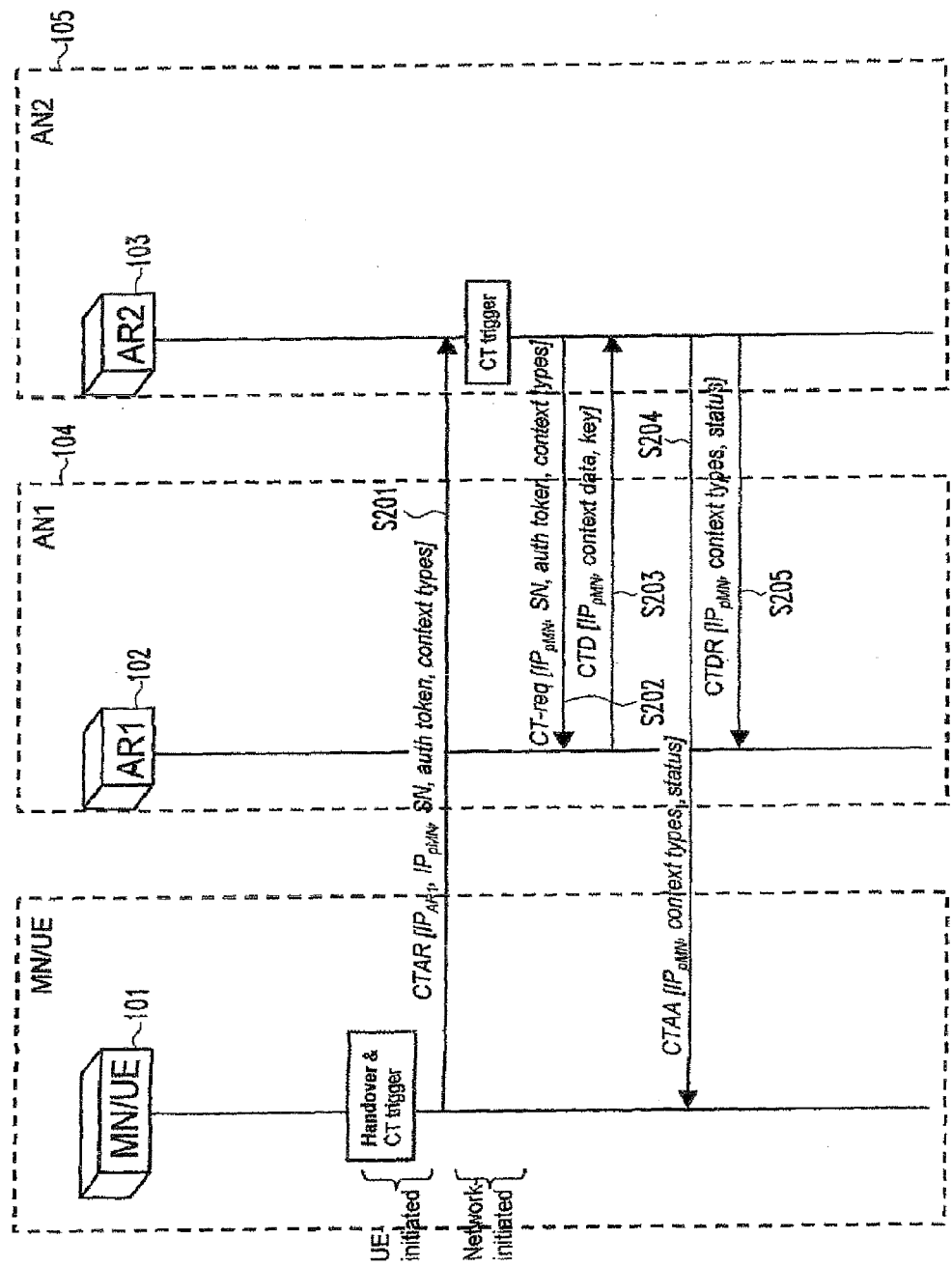
FIG. 2 depicts the signalling flow for reactive context transfer using CTP.

Other than in FIG. 1, AR1 102 forwards the CTAR message received in S403 to CTM1 302 in S404, which collects the context from all source entities 102, 401 in S405 and transfers the CTD message to CTM2 303 in S405. Note that the CTD message contains an additional field, the target AR's 103 IP address. In addition, if AN1 and AN2 employ different technologies in their radio interface or for packet transport in the core or aggregation network, at least a part of the context is translated in a step S412 from a format supported in AN1 into a different format, supported in AN2. This may be done in CTM1 before sending the CTD message, or in CTM2 subsequent to receiving this message. CTM2 in turn forwards the context to the corresponding target entities 103, 402, in step S407 which it determines based on the type of context. In S408 CTM2 303 can. acknowledge the receipt of the CTD message by sending a CTDR message to CTM1 302. After the handover, the MN sends a CTAR message to AR2 in S409. AR2 forwards the message to CTM2 in S410, which then again verifies the authorization token and informs the target entities to install the context in case of successful verification. Alternatively, CTM2 may send the context to the target entities only after successful verification of the token. In this case the target entities can install the context immediately. Note that the message contains the IP address of pAR and the MN at the time it was attached to the pAR. Finally, AR2 can inform MN in S411 about the status of the context transfer by sending a CTAA message.

Figure 5:
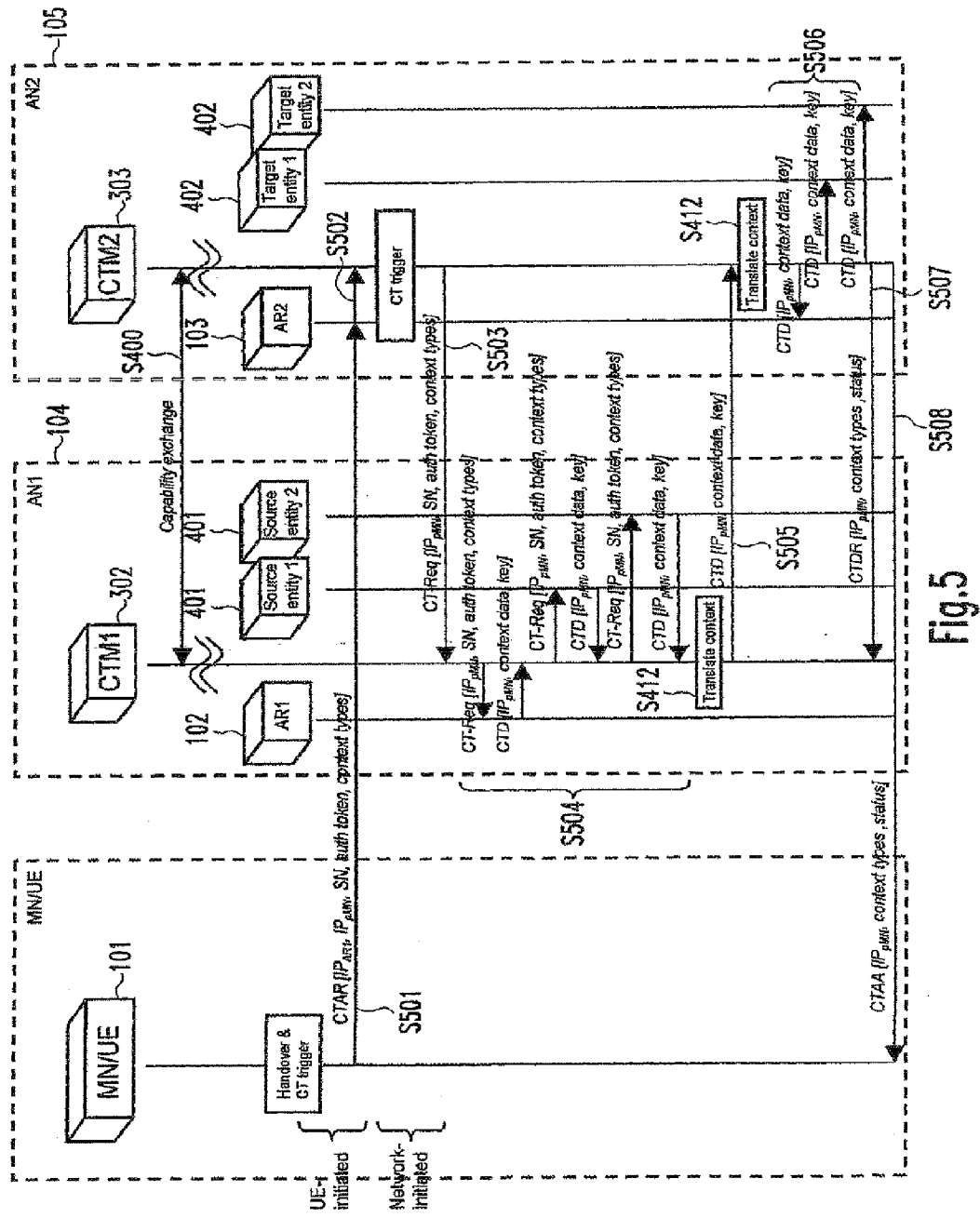
FIG. 5 illustrates the signalling flow for reactive inter-domain context transfer using CTP and CTMs.

FIG. 5 shows the corresponding signalling flow for a reactive context transfer. In this case, the CTAR message is sent in S501 from MN 101 to AR2 103 which forwards it to CTM2 303 in S502. In S503, CTM2 303 requests the context transfer from CTM1 302 with a CT-Req message specifying the previous IP address of MN 101 (while registered to AN1), a sequence number (SN) to match acknowledgements to requests, an authorization token and the types of context to be transferred. In S504 CTM1 302 collects the context from all source entities 102, 401 and transfers the CTD message to CTM2 303 in S505. Note that an additional field for the target AR's IP address in the CTD message is not required in this case, since the target CTM receives the CTAR message from the MN, which contains the target AR's IP address. In S506 CTM2 forwards the context to the corresponding target entities 103, 402 which it determines based on the type of context. Again, CTM2 303 can acknowledge the receipt of the CTD message by sending a CTDR message to CTM1 302 in S507 and inform MN 101 in S508 about the status of the context transfer by sending a CTAA message.

As with the proactive context transfer, at least a part of the context may be translated in S412 to a different format as required, in CTM1 before sending it with the CTD message, or in CTM 2 subsequent to receipt of this message.

The process described so far always routes the context over the CTMs. This is desired for inter-domain handovers, but in case of intra-domain handovers this is not necessary and results in worse performance, since the context transfer path is longer. To prevent this, the CT path is selected depending on the type of handover.

The handover performance is improved by handling intra- and inter-domain handover differently. The path over the CTMs should be used for inter-domain handover to minimize the number of inter-domain SAs and to enable context translation etc. In case of intra-domain handover the AR-to-AR CT path should be used instead, since the CTMs are not required and the direct path between the ARs is shorter. Which type of handover (intra- or inter-domain) is existent is determined in parts by the source AR and in parts by the source CTM. The source AR may transfer the context itself, if an SA exists to the target AR. Otherwise it forwards the CTAR message to the source CTM, which determines by itself if the target AR's IP address is part of its domain. It is therefore assumed that CTMs know the IP addresses or the address space of all ARs of their domain. In case the target AR is not in the same domain, the CTM concludes that an inter-domain handover is existent and transfers the context itself. Otherwise an intra-domain handover is assumed. In this case the CTM may send the CTAR message back to the source AR, which then can establish an SA to the target AR to transfer the context. The proposed solution requires no modification to CTP's message formats, but a modification of AR's state machine.

Figure 6:
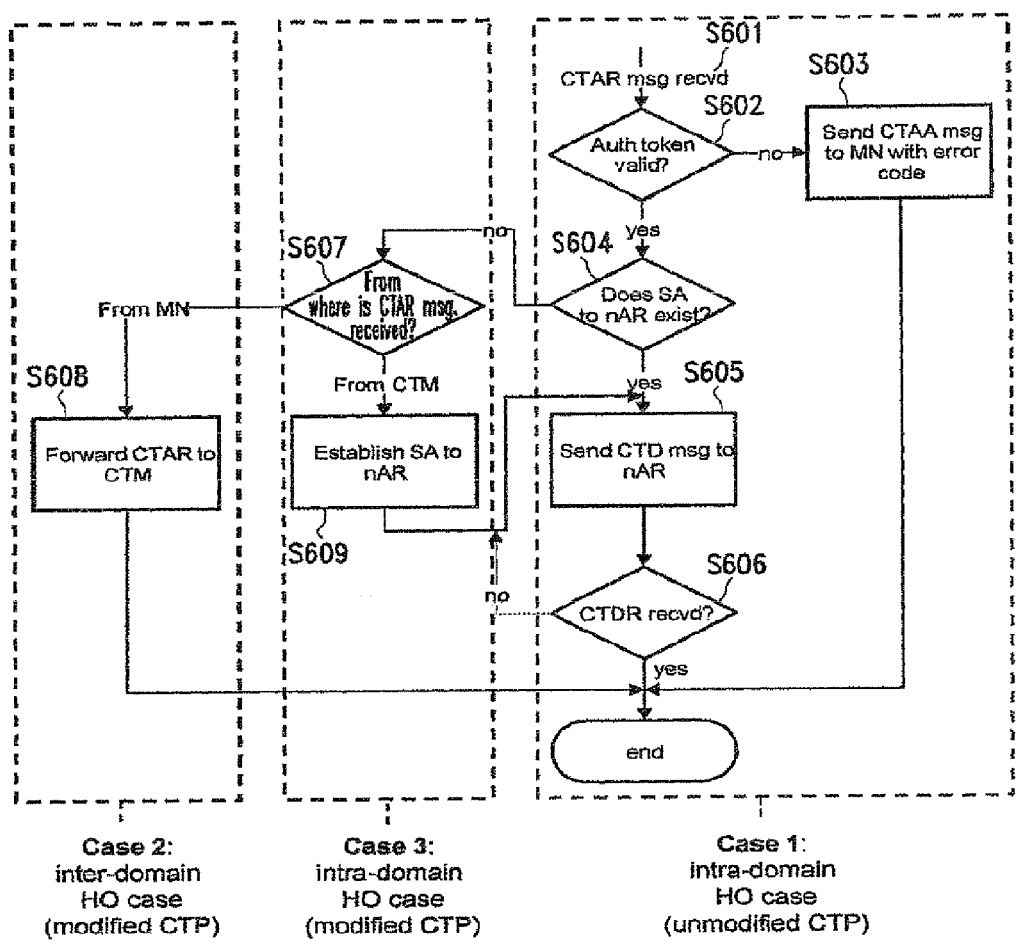
FIG. 6 depicts a flow chart of procedures in a pAR in case of proactive context transfer.

FIG. 6 shows a flow chart of this procedure taking place in pAR in case of a proactive context transfer. After receiving the CTAR message in S601, the AR validates the authorization token in S602. If the validation fails, the AR informs the MN in S603 by sending a CTAA message containing the error code. Otherwise, the pAR checks in S604 whether an SA exists to the target AR. If this is the case (case 1), an intra-domain handover is assumed and the pAR may transfer the context in S605 using a CTD message. The transfer is repeated in S605 and S606 until the target AR acknowledges the receipt with a CTDR message (optional). The process described so far is exactly the same as the process of unmodified CTP.

If S604 detects that no SA to the nAR exists, CTP would normally cancel the context transfer. With the modifications proposed in this invention, pAR checks in S607 whether the CTAR message was received from MN or CTM. This can be determined, e.g., based on the IP source address or a new flag in the CTAR message. If it has been received from the CTM, it is assumed that an intra-domain context transfer is required, and a SA from the source pAR to the target nAR is established in S609 for this purpose.

If the CTAR message has been received from the MN (case 2), the pAR assumes an inter-domain handover and forwards the CTAR message to its CTM in S608. The CTM knows the IP addresses or the address space of all ARs in its domain and thus can decide if an intra- or inter-domain handover is existent. In the latter case, it performs the context transfer itself: it collects the context from pAR and other entities using CT-req messages and sends an aggregated CTD message to the target CTM. The CTD message contains a new field for the target AR's IP address (see step S406 in FIG. 4). It is assumed that the address of the target CTM is known to the source CTM, e.g. by deriving it from the target AR's IP address. Furthermore, it is assumed that an SA exists between both CTMs (How the SA can automatically be established is described below). When the target CTM receives the CTD message, it forwards the individual contexts to the corresponding target entities using CTD messages. It is assumed that the IP address of a target entity corresponding to a specific type of context (such as IP address of the AAA server corresponding to AAA context) is known to the target CTM, e.g. by pre-configuration or by additional signalling e.g. to a database.

If the CTM decides that an intra-domain handover is existent, it may send the CTAR message back to the pAR, which then establishes an SA to the nAR (S609) and transfers the context (S605) as the unmodified CTP would do (case 3). The described solution can analogously applied to the reactive case as well.

The invention can analogously be applied to a hierarchy of CTMs. In case a network is multi-homed, a path other than the direct path between source and target network may be topologically shorter in certain situations or may have higher capacity, e.g. the path over the home networks if source and target network are both foreign networks with a low-bandwidth interconnection. In this ease the performance is increased if the CTM of the source network routes the context over the home network to the target CTM. For optimal performance, the context transfer duration of the alternative paths can be measured by the source CTM, either by sending explicit probe messages or passively using the messages of an ongoing context transfer. This information can then be used to select the best path for the next context transfer.

In the following, a mechanism for early establishment and cancellation of SAs between CTMs will be proposed. Candidate CTMs are determined based on the number of received broadcast messages containing layer 2 identifiers. These messages will in the following be called "beacons". The basic idea is to utilize information from layer 2 beacons received by the MN from APs of adjacent domains to trigger the early establishment and cancellation of SAs between CTMs. The MN either counts these beacons itself or periodically sends messages to the network, which counts the beacons on behalf of the MN. The count is done per time unit, which means that it is essentially a rate and that it is decreased if no beacons are received anymore. The beacon count state is maintained per AP's MAC address. If the signal strength of the MN indicates that a handover may be pending and a threshold A has been exceeded, the CARD protocol is started for the corresponding APs. Furthermore, the CARD reply message triggers the establishment of an SA between the corresponding CTMs. If a second threshold B is exceeded, the source CTM cancels all SAs except of the one corresponding to the AP, whose beacon count exceeded threshold B. Since only unused SAs may be cancelled, CTMs need to maintain some state information about the progress of a specific context transfer. Using the proposed threshold comparison, only the most probable SAs remain and resources are not wasted. Moreover, a context transfer can start immediately without additional handover latency resulting from the establishment of an SA.

Figure 7:
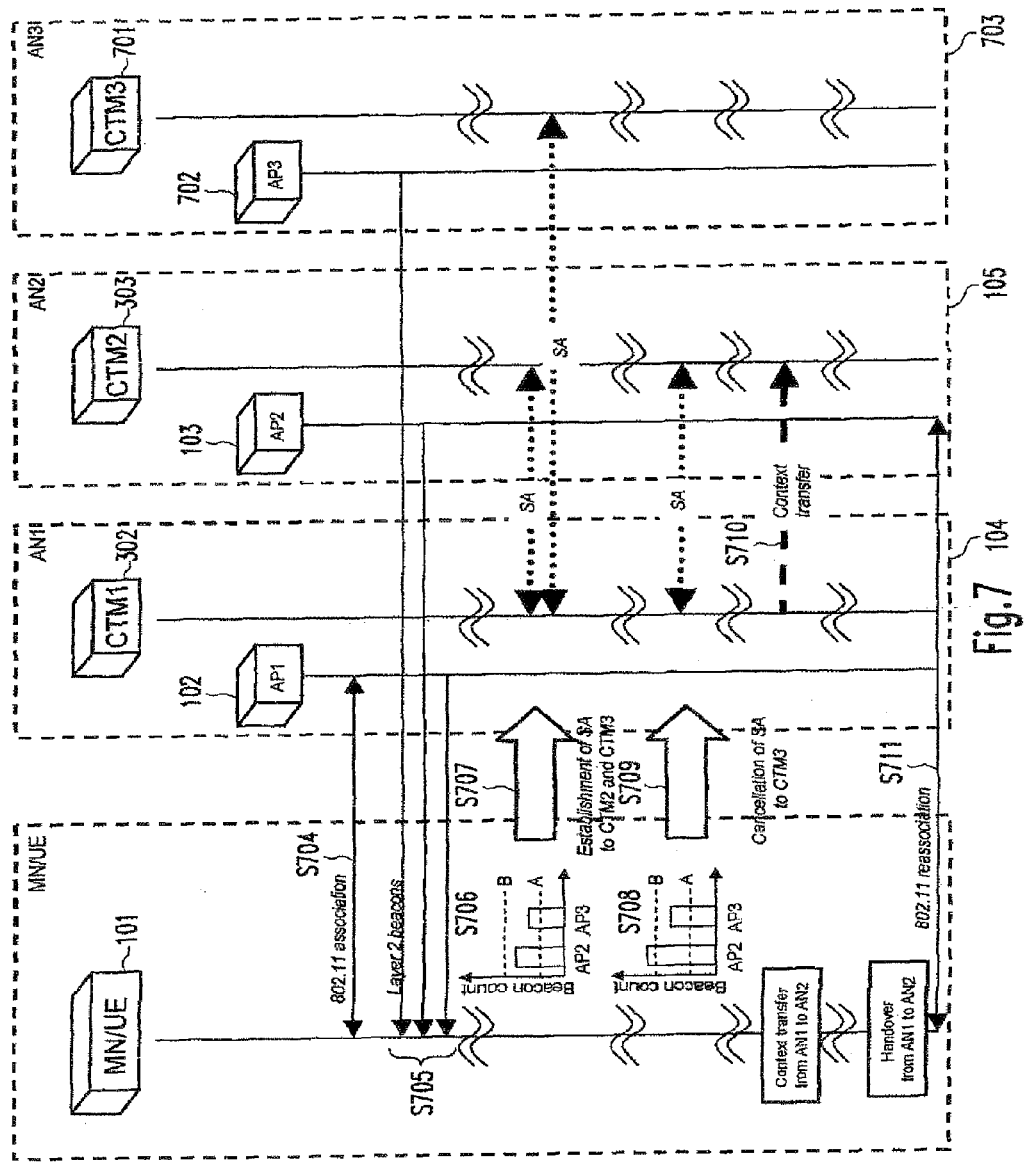
FIG. 7 depicts the signalling flow and beacon count state for early SA establishment and cancellation.

FIG. 7 illustrates this process. The MN 101 is associated in S704 to AP1 102 in Access Network 1 (AN1) 104. It receives beacons from AP2 103 and AP3 702 in AN2 105 and AN3 703, respectively in S705. Since the beacon count for both APs exceeded threshold A in counting step S706, an SA is established between CTM1 and CTM2 and CTM1 and CTM3, respectively in S707. After the beacon count for AP2 exceeded threshold B in counting step S708, the SA to AN3 is cancelled in S709. Subsequently, the SA already exists when a context transfer is performed to AN2 in S710 and when the actual handover occurs in S711, the context is already installed in the respective network entities in AN2.

Note, that in the current IEEE 802.11 specification, beacons of APs other than the one the STA is associated with cannot be received, if they send beacons on a different channel/frequency. However, other wireless technologies or future specifications of IEEE 802.11 may support this. Also note that in case APs send beacons in different time intervals, the entity responsible for comparing the beacon counts must be aware of the configured interval at a specific AP to be able to make a fair comparison, e.g. using normalization.

Figure 8:
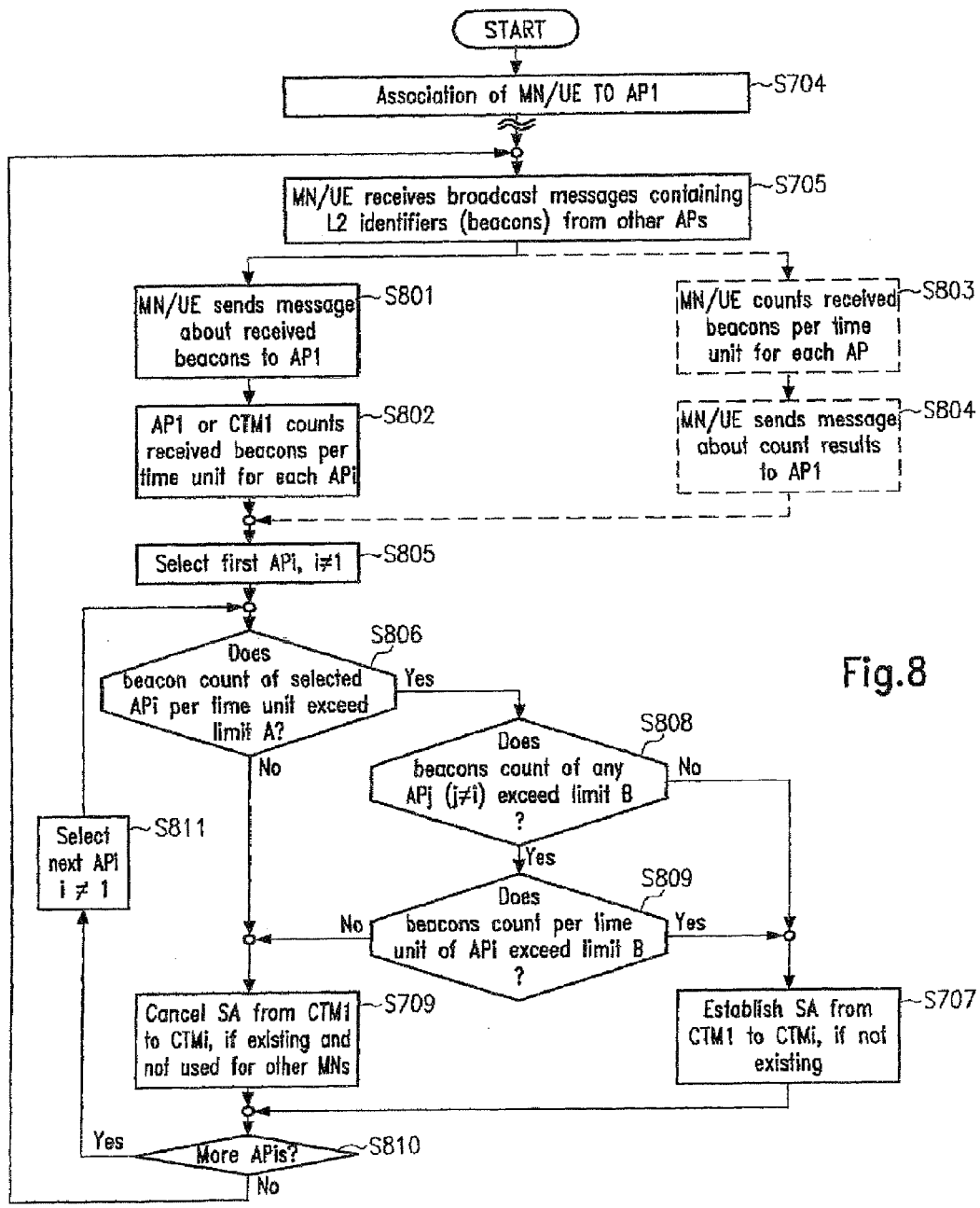
FIG. 8 shows a flow chart with the steps of a method for early establishment and early cancellation of security associations between Context Transfer Managers.

The steps of this method are depicted in more detail in the flow chart in FIG. 8. In S704, the MN/UE is associated to AP1. While it is associated with AP1, the MN/UE continuously or intermittently receives beacons from other APs (or ARs) in S705.

For the next two steps there exist two alternatives. In the first alternative the MN/UE sends messages about received beacons in S801 to AP1 which may forward them to CTM1. In S802 either AP1 or CTM1 counts received beacons per time unit for each APi separately. This step may also comprise the normalisation with regard to the rate of beacon transmissions of different APs, as described above.

In the second alternative the MN does the counting in S803 and sends the results to the AP1 in S804 which, again, may forward them to CTM1. Also here, the counting step may comprise a normalisation operation. Alternatively the normalisation may be done in the AP or CTM.

The following steps may be executed in the AP1 or CTM1. However, all steps apart from S709 and S707 could also be executed in the MN. In this case the MN would send instead of step S801 or step S804 messages to the CTM causing the CTM to perform steps S707 and/or S709.

In S805 a specific APi different from AP1 is selected. For this APi it is checked in S806 whether its (normalised) beacon count per time unit exceeds a predetermined limit A. If this is not the case, a possibly existing security association (SA) from CTM1 to CTMi in the radio access domain ANi of APi is cancelled with step S709, unless it is currently used and unless use is predicted for another mobile node. Then, the method continues in S810 with checking whether there are more APs to be treated. If so, a next APi is selected in S811 and steps from S806 are repeated for this APi. If all APs have been treated in this instance of steps S805 to S811, the method returns to the reception of beacons (S705).

Referring back to S806, if the (normalised) beacon count per time unit of APi exceeds limit A, it is next checked in S808 whether the (normalised) beacon count per time unit of any other APj exceeds the limit B described above. Alternatively another limit value C different from the value of B may be chosen here. If the condition of S808 is not fulfilled, the method concludes that APi is a likely handover candidate, and a SA is established in S707, if not yet existing, from CTM1 to CTMi in ANi to serve for the context transfer in the case of a handover. This way, time needed to complete the handover is reduced.

Referring back to S808, if at least one APj is found with a (normalised) beacon count per time unit exceeding limit B (or C, respectively), it is concluded that there is another strong handover candidate. In the case that the limit B is defined as a fixed value independent of the (normalised) beacon count per time unit of APi, it is checked in S809 whether also the (normalised) beacon count per time unit of APi exceeds limit B. In this case it is determined that both APi and APj are strong handover candidates and the method continues in step S707 with establishing an SA. from CTM1 to CTMi, if it does not exist already. In the case that the (normalised) beacon count per time unit of APi does not exceed limit B, it is concluded that APj is a much stronger handover candidate than APi and that any existing SA from CTM1 to CTMi will not be needed in the next future. Therefore such a SA is cancelled in S709 if it exists, unless it is currently used and unless use is predicted for another mobile node. This has the advantage that signalling overhead, requiring processing power in the CTMs and causing network load, is reduced.

Referring back to the "Yes" output of S808, in the case that limit B is defined at a certain margin above the (normalised) beacon count per time unit of APi, checking step S809 is unnecessary and the method continues directly with S709.

In any case the method continues thereafter with S810, checking whether there is any other APi to be treated, as described above.

In one alternative, the limit of S809 may be chosen as a value D different from the limit B (or C, respectively) of S808. Choosing limits B, C and D differently provides the possibility to adjust the average living time of SAs for an optimum compromise between handover acceleration and signalling overhead reduction.

Further threshold values may be defined to trigger more actions like context transfer and proactive establishment of data tunnels, depending on the likelihood of a handover to any access point or access router APi.

Context transfer manager 302, 303 is a logic entity which carries out the functions described above. It may be physically located in a dedicated server, within a network node such as a gateway or within other network entities like AAA server 304, 305.

Figure 9:
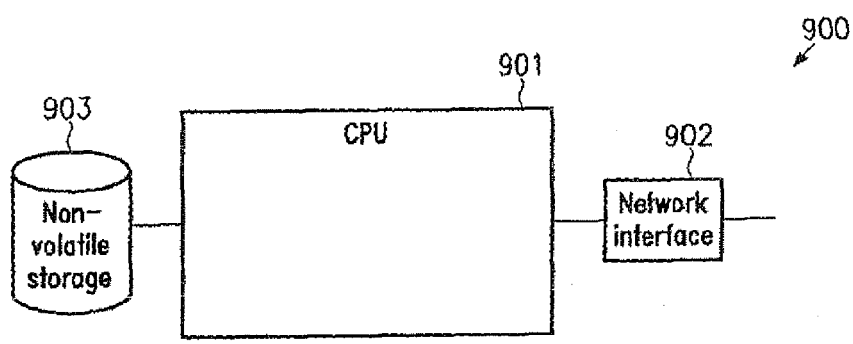
FIG. 9 illustrates the basic structure of a server which can be used as Context Transfer Manager.

FIG. 9 shows an exemplary structure of a server 900 which can be used as a Context Transfer Manager (CTM) as described above. It comprises at least one network interface 902, a central processing unit 901 and a non-volatile data storage 903.

CPU 901 comprises a processor or controller and working memory RAM. It is configured to perform the tasks of the CTM as described in detail above. Tasks of the CTM in the method described above can be implemented in hardware logic or in software executed on the processor or controller of the CPU. Also mixed implementations are possible. Programs comprising instructions which cause the server 900 to perform steps of the method described above may be stored in non-volatile memory 903 which may be a magnetic hard disk, optical disk, magnetic tape or non-volatile semiconductor memory like flash memory.

Server 900 may further comprise other units like keyboard, display or more network interfaces, which are not requied for the described tasks of the CTM and therefore optional. Server 900 may be co-located with a network node or realised in a separate entity.

What is claimed is:

1. An entity in a first access network comprising, the entity comprising a memory configured to store non-transient executable instructions and a processor configured, when executing the instructions stored in the memory:
    (a) to establish a security association between the entity in the first access network and an entity in a second access network when a number of broadcast messages received by a mobile terminal from an access point within the second access network exceeds a first predetermined threshold;
    (b) to at least partially translate context information related to the mobile terminal from a format supported in the first access network to another format supported in the second access network;
    (c) to forward the at least partially translated context information to at least one target entity in the second access network.

2. The entity of claim 1, wherein the processor is further configured to acquire information about the another format supported in the second access network.

3. The entity of claim 1, wherein the processor is further configured to forward the at least partially translated context information to at least one target entity in the second access network using messages defined in the Context Transfer Protocol (CTP).

4. The entity of claim 1, wherein the processor is further configured to initiate additional signaling related to data transmission for the mobile terminal for which context information if forwarded.

5. The entity of claim 4, wherein the additional signaling comprises at least one or more of managing Quality of Service (QoS) states, reserving a network resource, and establishing a data tunnel.

6. The entity of claim 1, wherein the processor is further configured to collect the context information from plural source entities comprising the first access network.

7. The entity of claim 1, wherein the processor is further configured to:
    receive from the entity of the second access network a message comprising information about the identity of the mobile terminal and about a type of control information to be forwarded;
    to collect the context information from plural source entities comprising the first access network; and then
    to perform act (b).

8. A method in an entity in a first access network, the method comprising:
    (a) establishing a security association between the entity in the first access network and an entity in a second access network when a number of broadcast messages received by a mobile terminal from an access point within the second access network exceeds a first predetermined threshold;
    (b) at least partially translating context information related to the mobile terminal from a format supported in the first access network to another format supported in the second access network;

(c) forwarding the at least partially translated context information to at least one target entity in the second access network.

9. The method of claim 8, further comprising acquiring information about the another format supported in the second access network.

10. The method of claim 8, further comprising forwarding the at least partially translated context information to at least one target entity in the second access network using messages defined in the Context Transfer Protocol (CTP).

11. The method of claim 8, further comprising initiating additional signaling related to data transmission for the mobile terminal for which context information if forwarded.

12. The method of claim 11, wherein the additional signaling comprises at least one or more of managing Quality of Service (QoS) states, reserving a network resource, and establishing a data tunnel.

13. The method of claim 8, further comprising collecting the context information from plural source entities comprising the first access network.

14. The method of claim 8, further comprising:
   receiving from the entity of the second access network a message comprising information about the identity of the mobile terminal and about a type of control information to be forwarded;
   collecting the context information from plural source entities comprising the first access network; and then performing act (b).

15. An entity in a first access network comprising a heterogeneous mobile network, the heterogeneous mobile network comprising plural access network domains; the entity comprising:
   a memory configured to store non-transient executable instructions;
   a processor configured, upon executing the executable instructions stored in the memory, to:
   (1) determine whether a handover request received in conjunction with a context transfer request message from a source access point is an intra-domain handover request or an inter-domain handover request;
   (2) if the handover request is determined to be the intra-domain handover request, to transfer the context transfer request message back to the source access point;
   (3) if the handover request is determined to be the inter-domain handover request, to
      (a) establish a security association between the entity in the first access network and an entity in a second access network when a number of broadcast messages received by a mobile terminal from an access point within the second access network exceeds a first predetermined threshold;
      (b) at least partially translate context information related to the mobile terminal from a format supported in the first access network to another format supported in the second access network;
      (c) forward the at least partially translated context information to at least one target entity in the second access network.

16. A method in an entity in a first access network comprising a heterogeneous mobile network, the heterogeneous mobile network comprising plural access network domains; the method comprising:
   determining whether a handover request received in conjunction with a context transfer request message from a source access point is an intra-domain handover request or an inter-domain handover request;
   if the handover request is determined to be the intra-domain handover request, transferring the context transfer request message back to the source access point;
   if the handover request is determined to be the inter-domain handover request,
      (a) establishing a security association between the entity in the first access network and an entity in a second access network when a number of broadcast messages received by a mobile terminal from an access point within the second access network exceeds a first predetermined threshold;
      (b) at least partially translating context information related to the mobile terminal from a format supported in the first access network to another format supported in the second access network;
      (c) forwarding the at least partially translated context information to at least one target entity in the second access network.

* * * * *